US008320002B2

(12) United States Patent
Horiyama

(10) Patent No.: US 8,320,002 B2
(45) Date of Patent: Nov. 27, 2012

(54) PRINTING SYSTEM, INFORMATION PROCESSING APPARATUS, IMAGE FORMING APPARATUS, INFORMATION PROCESSING METHOD, AND PROCESSING METHOD CAPABLE OF IMPLEMENTING 2-PATH PRINTING

(75) Inventor: Jun Horiyama, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 871 days.

(21) Appl. No.: 12/421,806

(22) Filed: Apr. 10, 2009

(65) Prior Publication Data

US 2009/0279130 A1 Nov. 12, 2009

(30) Foreign Application Priority Data

May 7, 2008 (JP) ................................ 2008-121649

(51) Int. Cl.

| | |
|---|---|
| ***G06F 3/12*** | (2006.01) |
| ***G06K 15/00*** | (2006.01) |
| ***H04N 1/60*** | (2006.01) |
| ***G03B 27/04*** | (2006.01) |
| ***G03B 27/14*** | (2006.01) |

(52) U.S. Cl. ..................... 358/1.15; 358/1.16; 358/1.17; 358/1.9; 355/88; 355/112; 355/114

(58) Field of Classification Search ................. 358/1.15, 358/1.16, 1.1, 1.9, 1.17, 1.12; 399/67, 82, 399/328, 321, 382, 330, 233, 122, 320, 390, 399/49, 38; 355/25, 46, 82, 319, 88, 112, 355/114, 127, 132

See application file for complete search history.

(56) References Cited

U.S. PATENT DOCUMENTS

| | | | | |
|---|---|---|---|---|
| 7,039,558 | B2 | 5/2006 | Isshiki | 702/186 |
| 7,245,844 | B2 * | 7/2007 | de Jong et al. | 399/69 |
| 2003/0182368 | A1 * | 9/2003 | Horiyama | 709/203 |
| 2005/0223011 | A1 | 10/2005 | Horiyama | 707/10 |
| 2007/0280759 | A1 | 12/2007 | Isemura et al. | 399/341 |
| 2008/0166137 | A1 * | 7/2008 | Kanai | 399/12 |
| 2008/0186530 | A1 * | 8/2008 | Kurozasa | 358/1.15 |

FOREIGN PATENT DOCUMENTS

| | | |
|---|---|---|
| JP | 2002-033868 | 1/2002 |
| JP | 2002-055576 A | 2/2002 |
| JP | 2007-141100 A | 6/2007 |
| JP | 2007-322818 A | 12/2007 |
| JP | 2008-077493 A | 4/2008 |

* cited by examiner

*Primary Examiner* — Benny Q Tieu
*Assistant Examiner* — Ngon Nguyen
(74) *Attorney, Agent, or Firm* — Fitzpatrick, Cella, Harper & Scinto

(57) ABSTRACT

This invention provides a flexible method capable of appropriately determining whether 2-path printing can proceed especially to second-path processing, in order to apply a conventional upper limit management mechanism to a 2-path printing system. According to this invention, when executing 2-path printing, the printing system performs upper limit management based on the sheet count of use for a user. When executing second-path print processing, even if the count of sheets used by the user in first-path print processing has reached an upper limit value, print processing is permitted in second-path print processing.

22 Claims, 11 Drawing Sheets

FIG. 4

4a

305

| | UPPER LIMIT VALUE OF USE | |
|---|---|---|
| USER NAME | UPPER LIMIT SHEET COUNT | UPPER LIMIT MONEY AMOUNT |
| A | 2 | |
| B | 7 | |
| C | 6 | |
| D | | 20 |
| E | | 100 |

4b

305

| | UPPER LIMIT VALUE OF USE | |
|---|---|---|
| USER NAME | UPPER LIMIT SHEET COUNT | UPPER LIMIT MONEY AMOUNT |
| A | | 40 |
| B | 7 | |
| C | 6 | |
| D | | 20 |
| E | | 100 |

FIG. 5

306

| DEVICE NAME | IP ADDRESS | CLEAR |
|---|---|---|
| AAA | 111.11.111.111 | × |
| BBB | 111.11.111.222 | ○ |
| CCC | 111.11.111.333 | ○ |
| DDD | 111.11.111.444 | ○ |
| EEE | 111.11.111.555 | × |
| FFF | 111.11.111.666 | × |

FIG. 6

308

| PRINT TYPE | MONEY AMOUNT |
|---|---|
| MONOCHROME | 10 |
| COLOR | 20 |
| CLEAR | 30 |

FIG. 7

307

| JOB ID | PRINT SHEET COUNT | USER NAME | PRINT TYPE | FIRST PATH | SECOND PATH |
|---|---|---|---|---|---|
| 1 | 3 | B | COLOR | | |
| 2 | 2 | C | MONOCHROME | | |
| 3 | 4 | C | COLOR+CLEAR | | |
| 4 | 4 | B | COLOR | | |
| 5 | 2 | A | COLOR | ○ | |
| 6 | 2 | E | CLEAR | | ○ |

FIG. 8

309

| USER NAME | IMAGE FORMING APPARATUS 102 | |
|---|---|---|
| | CUMULATIVE SHEET COUNT | CUMULATIVE MONEY AMOUNT |
| A | 2 | 40 |

FIG. 14

| JOB ID | PRINT SHEET COUNT | USER NAME | PRINT TYPE | FIRST PATH | SECOND PATH |
|---|---|---|---|---|---|
| 1 | 3 | B | COLOR | | |
| 2 | 2 | C | MONOCHROME | | |
| 3 | 4 | C | COLOR+CLEAR | | |
| 4 | 4 | B | COLOR | | |
| 5 | 2 | A | COLOR | ○ | |
| 6 | 2 | E | CLEAR | | ○ |
| 7(5) | 2 | A | CLEAR | | ○ |

FIG. 15

| USER NAME | CUMULATIVE SHEET COUNT | CUMULATIVE MONEY AMOUNT |
|---|---|---|
| A | 2 | 100 |

PRINTING SYSTEM, INFORMATION PROCESSING APPARATUS, IMAGE FORMING APPARATUS, INFORMATION PROCESSING METHOD, AND PROCESSING METHOD CAPABLE OF IMPLEMENTING 2-PATH PRINTING

BACKGROUND OF THE INVENTION

1. Field of the Invention

The present invention relates to a printing system, information processing apparatus, image forming apparatus, information processing method, and processing method.

2. Description of the Related Art

There have conventionally been known a variety of systems in which a plurality of apparatuses operate in cooperation with each other. An example of such systems is one which provides a copy function by connecting a scanner apparatus for scanning an image and an image forming apparatus for printing an image.

Some image forming apparatuses have a counter function for counting the number of delivered sheets or the like, and a charging function for calculating the charge (processing charge) of processing.

There has been proposed a method of, in a system which executes processing using two apparatuses in cooperation with each other, determining whether the partner apparatus has the charging function when determining an apparatus for charging in order to manage the use status (the number of sheets used and the charge of use) of a user (see Japanese Patent Laid-Open No. 2002-033868). This method can avoid double charging.

Recently in the fields of commercial printing and the like, after a given printing apparatus performs print processing, another apparatus executes coating processing to coat the printout with a glossy toner called a clear toner. A printing system which finishes a printed material at higher quality according to this technique is becoming popular. In this system, the user can select conventional normal printing or high-quality printing when printing an image. A method of performing high-quality printing via these two paths (using two apparatuses in cooperation with each other) will be called 2-path printing. In contrast, a method of achieving high-quality printing via one path (using only one apparatus) will be called 1-path printing. In high-quality printing by 1-path printing, a sheet having undergone print processing undergoes clear toner coating processing without delivering the sheet. An example of 2-path printing is form printing. In this case, a printed material the user wants can be created by performing normal printing in the first path and compositing form data registered in advance in an apparatus for the second path.

However, in 2-path printing in which different apparatuses provide normal printing and high-quality printing, a method different from the management method proposed in Japanese Patent Laid-Open No. 2002-033868 is required to manage the use status of a user.

For example, when the charging function of either apparatus operates, as disclosed in Japanese Patent Laid-Open No. 2002-033868, no accurate processing charge can be calculated in high-quality printing.

More specifically, the processing charge of high-quality printing is the sum of a charging result in an image forming apparatus which performs normal printing and a charging result in an image forming apparatus which applies a clear toner. If only the charging function of one image forming apparatus operates in 2-path printing, no accurate processing charge can be calculated. The user may select high-quality printing but perform only normal printing without actually executing high-quality printing, and vice versa. When either apparatus charges a user for all processes, the accuracy of the processing charge is poor.

To solve this, the charging functions of all apparatuses may operate. In this case, the processing charges of toner and the like can be accurately calculated. However, the processed-sheet count value may not be accurate. More specifically, when each apparatus acquires a count value on the basis of the delivered-sheet count in 2-path printing, processed sheets are counted up though the same sheets as those in the first path are printed.

If sheets are counted double, no accurate processed-sheet count can be calculated. Further, the use of high-quality printing is limited. Assume that the system manages the upper limit of the sheet count of use for each user. If the processed-sheet count of a user reaches the upper limit upon printing by a first-path image forming apparatus for executing normal printing, processing to inhibit printing over the upper limit is executed for print processing of applying a clear toner in the second path, and the print processing may end. However, the user does not use new sheets in the second path, so the inhibition of printing in the second path is not a normal operation.

From this, demand has arisen for appropriately managing the prices of toner and the like, and the processing charge based on the sheet count and the like, and flexibly avoiding a situation in which the use of an image forming apparatus by a user is improperly limited in a system in which a plurality of image forming apparatuses cooperate with each other.

SUMMARY OF THE INVENTION

The present invention has been made to overcome the conventional drawbacks.

A printing system according to the present invention comprises the following arrangement.

That is, a printing system capable of implementing 2-path printing using a plurality of image forming apparatuses in cooperation with each other, the system comprises: an actual performance management unit configured to manage, as actual performance for each user, a count of sheets used in print processing; an upper limit management unit configured to store an upper limit value of a printable sheet count for each user, and perform print inhibition processing on the basis of a print request from a user for whom the actual performance of the sheet count managed by the actual performance management unit exceeds the upper limit value; a first processing unit configured to, in a first image forming apparatus, execute first-path print processing in 2-path printing and deliver a printed material; and a second processing unit configured to execute second-path print processing in the 2-path printing for the printed material in a second image forming apparatus, wherein even if the actual performance of the sheet count managed by the actual performance management unit for the user who has designated the 2-path printing has reached the upper limit value in the second-path print processing in the 2-path printing, the upper limit management unit does not perform the inhibition processing, and the second processing unit performs the second-path print processing.

An information processing method in the printing system according to the present invention comprises the following steps.

That is, an information processing method in a printing system capable of implementing 2-path printing using a plurality of image forming apparatuses in cooperation with each other, the method comprises: an actual performance management step of managing, as actual performance for each user, a count of sheets used in print processing; an upper limit management step of storing an upper limit value of a printable sheet count for each user, and performing print inhibition processing on the basis of a print request from a user for whom the actual performance of the sheet count managed in the actual performance management step exceeds the upper limit value; a first processing step of, in a first image forming apparatus, executing first-path print processing in 2-path printing and delivering a printed material; and a second processing step of executing second-path print processing in the 2-path printing for the printed material in a second image forming apparatus, wherein even if the actual performance of the sheet count managed in the actual performance management step for the user who has designated the 2-path printing has reached the upper limit value in the second-path print processing in the 2-path printing, the inhibition processing is not performed in the upper limit management step, and the second-path print processing is performed in the second processing step.

An information processing apparatus according to the present invention comprises the following arrangement.

That is, an information processing apparatus in a printing system capable of implementing 2-path printing using an image forming apparatus, the information processing apparatus comprises: a collection unit configured to collect, from the image forming apparatus, log information of print processing that allows identifying a user who has designated the print processing; an actual performance management unit configured to manage, as actual performance for each user, a count of sheets used in print processing on the basis of the log information collected by the collection unit; and an upper limit management unit configured to store an upper limit value of a printable sheet count for each user, and perform print inhibition processing on the basis of a print request from a user for whom the actual performance of the sheet count managed by the actual performance management unit exceeds the upper limit value, wherein even if the actual performance of the sheet count managed by the actual performance management unit for the user who has designated the 2-path printing has reached the upper limit value in second-path print processing in the 2-path printing, the upper limit management unit does not perform the inhibition processing, and the second-path print processing in the 2-path printing is performed in the printing system.

An information processing method in the information processing apparatus according to the present invention comprises the following steps.

That is, an information processing method in an information processing apparatus which builds a printing system capable of implementing 2-path printing using an image forming apparatus, the method comprises: a collection step of collecting, from the image forming apparatus, log information of print processing that allows identifying a user who has designated the print processing; an actual performance management step of managing, as actual performance for each user, a count of sheets used in print processing on the basis of the log information collected in the collection step; and an upper limit management step of storing an upper limit value of a printable sheet count for each user, and performing print inhibition processing on the basis of a print request from a user for whom the actual performance of the sheet count managed in the actual performance management step exceeds the upper limit value, wherein even if the actual performance of the sheet count managed in the actual performance management step for the user who has designated the 2-path printing has reached the upper limit value in second-path print processing in the 2-path printing, the inhibition processing is not performed in the upper limit management step, and the second-path print processing in the 2-path printing is performed in the printing system.

An image forming apparatus according to the present invention comprises the following arrangement.

That is, an image forming apparatus capable of implementing 2-path printing in cooperation with another image forming apparatus in a printing system in which a count of sheets used in print processing is managed as actual performance for each user, and print inhibition processing is performed based on a print request from a user for whom the actual performance of the sheet count managed for each user exceeds an upper limit value, the apparatus comprises: a feed unit configured to feed a printed material of the other image forming apparatus; a processing unit configured to perform second-path print processing in the 2-path printing for the printed material fed by the feed unit; an acquisition unit configured to acquire identification information used to manage actual performance in first-path print processing in the 2-path printing; and an output unit configured to externally output log information of print processing by the processing unit together with the identification information acquired by the acquisition unit, wherein even if the actual performance of the count of sheets used in print processing for a user who has designated the 2-path printing has reached the upper limit value, the inhibition processing is not performed, and the processing unit performs the second-path print processing.

A processing method in the image forming apparatus according to the present invention comprises the following steps.

That is, a processing method in an image forming apparatus capable of implementing 2-path printing in cooperation with another image forming apparatus in a printing system in which a count of sheets used in print processing is managed as actual performance for each user, and print inhibition processing is performed based on a print request from a user for whom the actual performance of the sheet count managed for each user exceeds an upper limit value, the method comprises: a feed step of feeding a printed material of the other image forming apparatus; a processing step of performing second-path print processing in the 2-path printing for the printed material fed in the feed step; an acquisition step of acquiring identification information used to manage actual performance in first-path print processing in the 2-path printing; and an output step of externally outputting log information of print processing in the processing step together with the identification information acquired in the acquisition step, wherein even if the actual performance of a count of sheets used in print processing for a user who has designated the 2-path printing has reached the upper limit value, the inhibition processing is not performed, and the second-path print processing is performed in the processing step.

The present invention can apply flexible upper limit management even in 2-path printing when the user uses an image forming apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a table showing an example of user information 305;

FIG. 5 is a table showing an example of device information 306;

FIG. 6 is a table showing an example of processing charge information 308;

FIG. 7 is a table showing an example of print log information 307;

FIG. 8 is a table showing an example of cumulative sheet count & cumulative money amount information 309;

FIG. 14 is a table showing an example of the print log information 307 after processing in the embodiment; and FIG. 15 is a table showing an example of the cumulative sheet count & cumulative money amount information 309 after processing in the embodiment.

DESCRIPTION OF THE EMBODIMENTS

Exemplary embodiments of the present invention will now be described in detail in accordance with the accompanying drawings.

First Embodiment

<1. Configuration of Image Forming System>

Figure 1:
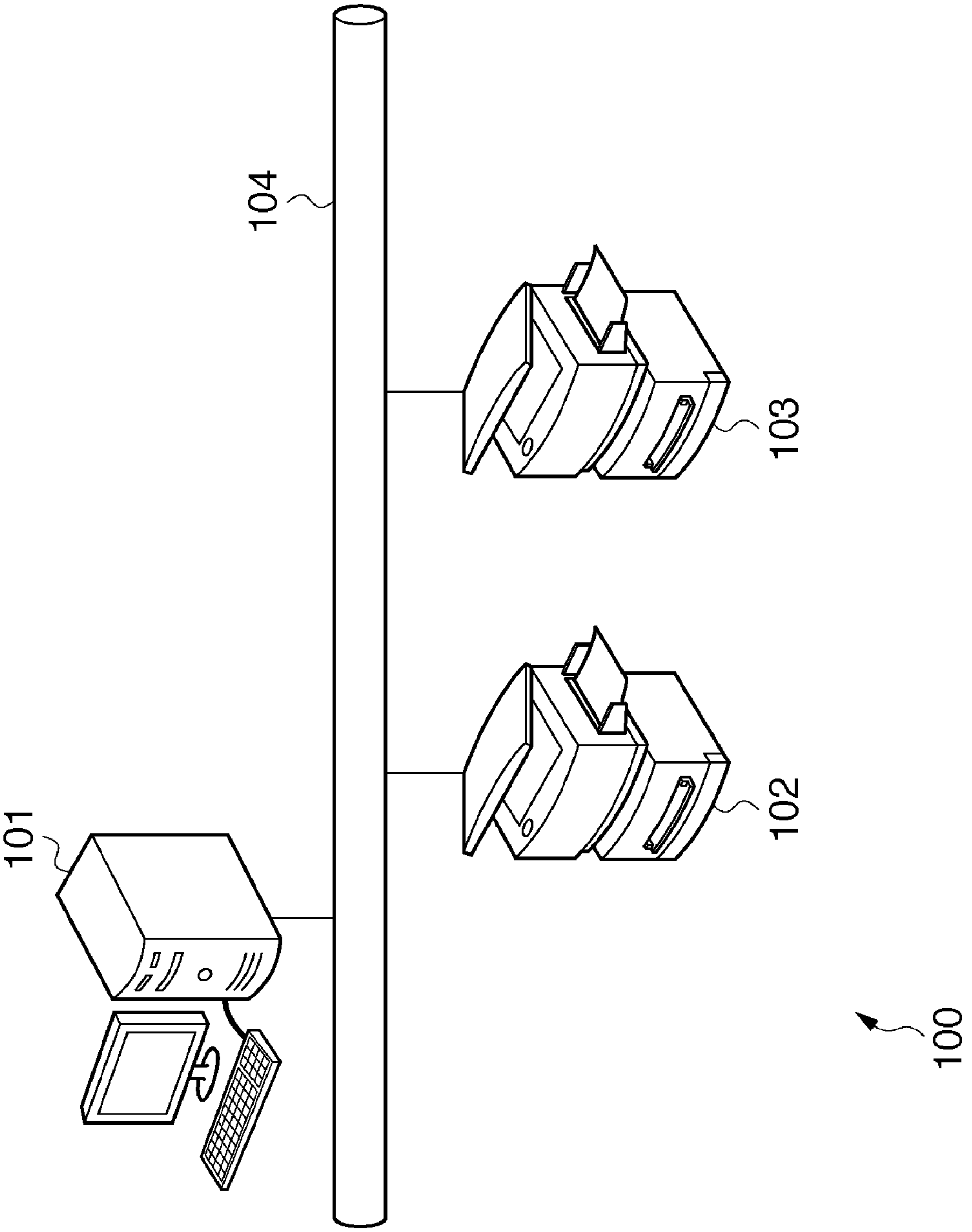
FIG. 1 is a view showing the overall configuration of an image forming system having an information processing apparatus according to the first embodiment of the present invention.

FIG. 1 is a view showing the overall configuration of an image forming system having an information processing apparatus according to the first embodiment of the present invention. In FIG. 1, reference numeral 101 denotes an information processing apparatus. An image forming apparatus (first image forming apparatus) 102 has a scanner function, printer function, multi-functional peripheral function, and the like. An image forming apparatus (second image forming apparatus) 103 has a function of applying a clear toner, and can implement 2-path printing in cooperation with the image forming apparatus 102. The information processing apparatus 101 and the image forming apparatuses 102 and 103 are connected to each other via a network 104 such as a LAN. The embodiment assumes that the image forming apparatus 102 performs first-path print processing (first processing) in 2-path printing and the image forming apparatus 103 performs second-path print processing (second processing).

The information processing apparatus 101 stores a 2-path upper limit management program (details of which will be described later) so as to be able to execute the program. The information processing apparatus 101 manages actual performance information based on pieces of log information of respective jobs that are collected from the image forming apparatuses 102 and 103. The information processing apparatus 101 also stores and manages the printable upper limit value of use in order to perform upper limit management based on the actual performance information.

<2. Arrangements of Information Processing Apparatus and Image Forming Apparatus>

Figure 2:
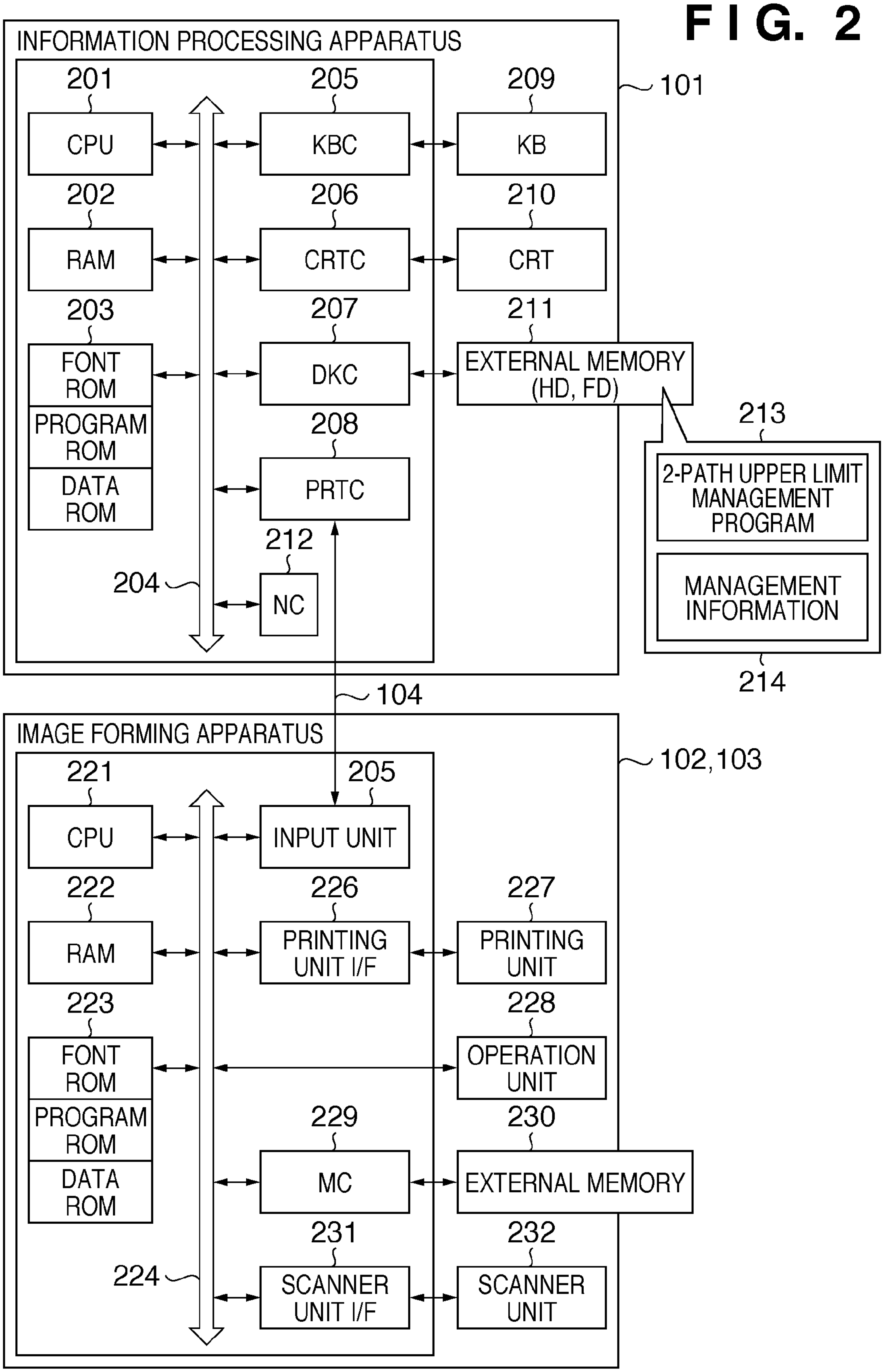
FIG. 2 is a block diagram showing the detailed arrangements of an information processing apparatus 101 and image forming apparatuses 102 and 103.

FIG. 2 is a block diagram showing the detailed arrangements of the information processing apparatus 101 and the image forming apparatuses 102 and 103.

The arrangement of the information processing apparatus 101 will be explained first. In FIG. 1, a CPU 201 executes programs such as an OS and application (e.g., a 2-path upper limit management program) which are stored in the program ROM of a ROM 203 or loaded from an external memory 211 to a RAM 202.

The OS stands for an operating system which runs on a computer. The operating system will be called an OS. By executing the 2-path upper limit management program, 2-path upper limit management processing shown in a flowchart to be described later is achieved.

The RAM 202 functions as a main memory, work area, and the like for the CPU 201. A keyboard controller (KBC) 205 controls key inputs from a keyboard (KB) 209 and a pointing device (not shown).

A CRT controller (CRTC) 206 controls display on a CRT 210. A disk controller (DKC) 207 controls data access in the external memory 211 such as a hard disk (HD) or Floppy® disk (FD) which stores various programs and various kinds of information.

The external memory 211 is a hard disk (HD) or Floppy® disk (FD) which stores various programs and various kinds of information. The external memory 211 stores a 2-path upper limit management program 213, and management information 214 processed in accordance with this program. The 2-path upper limit management program 213 and management information 214 will be described later.

A PRTC 208 controls exchange of signals with the connected image forming apparatuses 102 and 103. An NC 212 is connected to a network and executes communication control processing with another device connected to the network.

The arrangement of the image forming apparatus 102 or 103 will be explained. In the image forming apparatus 102 or 103, as shown in FIG. 2, a CPU 221 in the image forming apparatus 102 or 103 controls blocks connected to a system bus 224 on the basis of control programs stored in a ROM 223 and external memory 230.

An image signal generated by processing of the CPU 201 is output as output information to a printing unit (image forming apparatus engine) 227 via a printing unit I/F 226. The CPU 221 can communicate with the information processing apparatus 101 via an input unit 225. By the communication processing, the CPU 221 can notify the information processing apparatus 101 of various kinds of information in the image forming apparatus 102 or 103.

A program ROM in a ROM 223 stores control programs and the like for the CPU 221. A font ROM in the ROM 223 stores font data and the like used to generate output information. For an image forming apparatus not equipped with the external memory 230 such as a hard disk, a data ROM in the ROM 223 stores various kinds of information used in the information processing apparatus 101.

A RAM 222 functions as a main memory, work area, and the like for the CPU 221. The RAM 222 can increase its memory capacity by an optional RAM connected to an expansion port (not shown). The RAM 222 is used as an output information rasterization area, environment data storage area, NVRAM, and the like.

A memory controller (MC) 229 controls access to the external memory 230. The external memory 230 is connected as an option, and stores font data, an emulation program, form data, and the like.

An operation unit 228 has switches, an LED display (display), and the like for operation. The operation unit 228 displays UI (User Interface) windows such as an operation window and notification window which provide information to the user.

The printing unit 227 executes monochrome printing and color printing on a print medium such as paper on the basis of an image signal received via the printing unit I/F 226. In the image forming apparatus 103, the printing unit 227 performs processing of coating the surface of a printed medium with a clear toner.

A scanner unit I/F 231 performs correction, processing, and editing for image data received from a scanner unit 232.

The scanner unit 232 converts image information into an electrical signal by guiding, to a CCD, reflected light obtained by exposing and scanning an image on a document. Further, the scanner unit 232 converts the electrical signal into R, G, and B luminance signals, and outputs the luminance signals as image data. When the user designates the start of reading via the operation unit 228, the scanner unit 232 receives a document reading instruction. Upon receiving the instruction, the scanner unit 232 reads a document.

As the document reading method, a document sheet set on a document feeder (not shown) may also be automatically fed. A document sheet may also be set on a glass surface (not shown) and scanned by moving the exposure unit.

<3. Details of Module Configuration of 2-Path Upper Limit Management Program and Management Information in Information Processing Apparatus>

Figure 3:
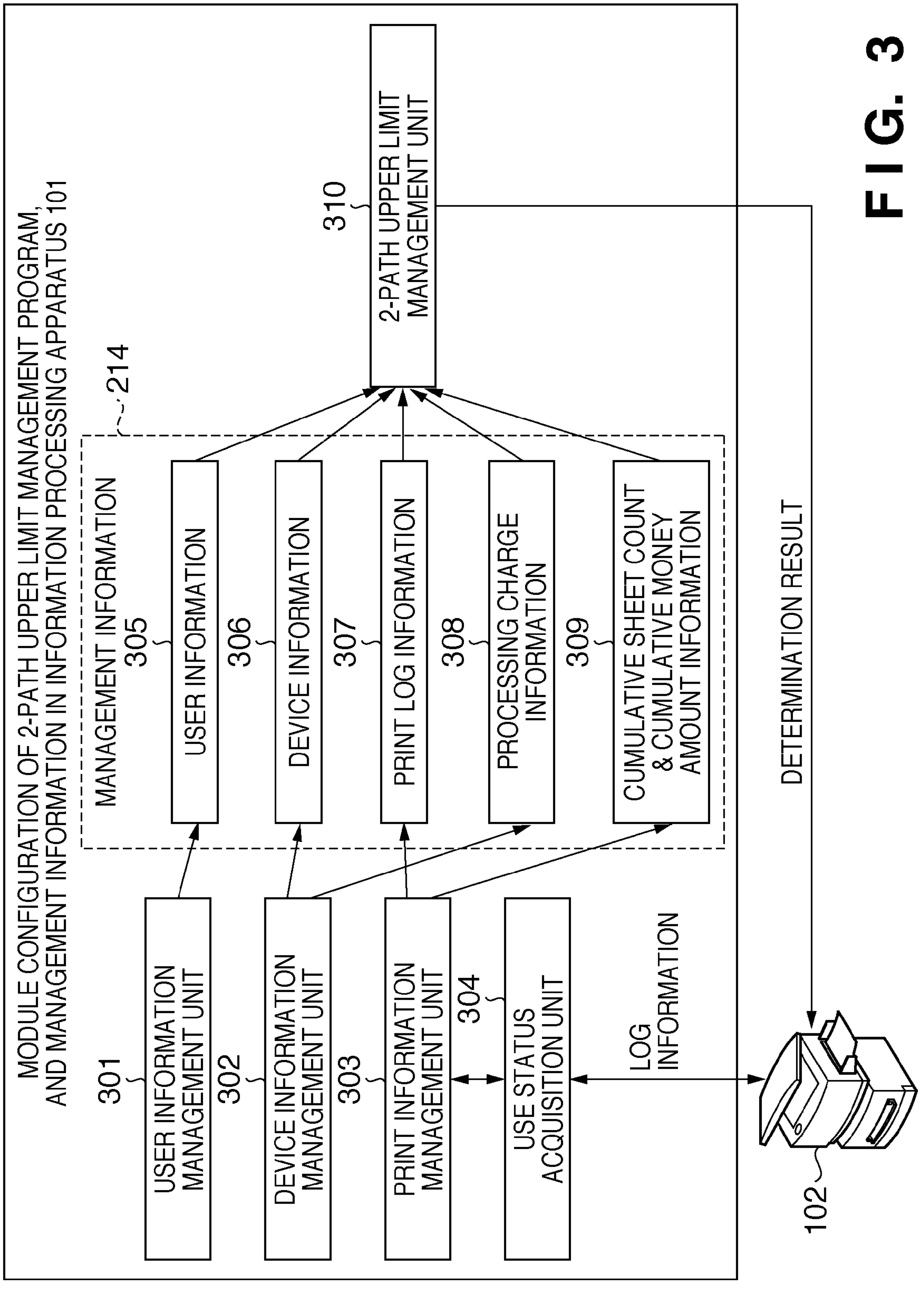
FIG. 3 is a block diagram showing details of the module configuration of a 2-path upper limit management program 213, and management information 214 in the information processing apparatus 101.

FIG. 3 is a block diagram showing details of the module configuration of the 2-path upper limit management program 213 and the management information 214 in the information processing apparatus 101. FIGS. 4 to 8 are tables showing examples of the management information 214. The module configuration of the 2-path upper limit management program 213 will be explained with reference to FIGS. 4 to 8.

(1) User Information Management Unit

In FIG. 3, a user information management unit 301 manages user information (information capable of identifying a user) 305 set by the administrator. FIG. 4 is a table showing an example of the user information 305 set via the user information management unit 301.

As shown in FIG. 4, the user information 305 sets, for each user, the upper limit value of use when he uses an image forming system 100.

In an example 4*a* of FIG. 4, the upper limit of the number of sheets user “A” can use is “2”. Similarly, the upper limit of the number of sheets user “B” can use is “7”, and that of the number of sheets user “C” can use is “5”.

The upper limit (upper limit charge) of the amount of money user “D” can use is “¥20”, and that of the amount of money user “E” can use is “¥100”.

The administrator can select, via the user information management unit 301, whether to manage the upper limit value of use by “sheet count” or “money amount”. The user information 305 is set based on the selection result.

In an example 4*b* of FIG. 4, the management method of the upper limit value of use for user “A” changes from “sheet count” to “money amount”. In this case, the upper limit of the number of sheets user “A” can use is canceled while the upper limit of the amount of money he can use is set to “¥40”.

(2) Device Information Management Unit

In FIG. 3, a device information management unit 302 manages device information 306 set by the administrator. The device information management unit 302 also manages processing charge information 308 containing information on the processing charge when an image forming apparatus managed by the device information 306 has executed processing.

FIG. 5 is a table showing an example of the device information 306. As shown in FIG. 5, the device information 306 holds the device name of each image forming apparatus managed by the information processing apparatus 101 in correspondence with an IP address (location). Further, the device information 306 holds information representing whether each image forming apparatus can perform processing of applying a clear toner.

In the example of FIG. 5, the device information 306 represents that the IP address of device name “AAA” is “111.11.111.111”, and device “AAA” does not cope with clear toner coating processing.

Similarly, the device information 306 represents that the IP address of device name “BBB” is “111.11.111.222”, and device “BBB” copes with clear toner coating processing. Further, the device information 306 represents that the IP address of device name “CCC” is “111.11.111.333”, and device “CCC” copes with clear toner coating processing.

FIG. 6 is a table showing an example of the processing charge information 308. As shown in FIG. 6, the processing charge information 308 sets the processing charge for each print type (processing contents). In the example of FIG. 6, the processing charge information 308 represents that “monochrome” printing of one sheet costs “¥10”. Similarly, the processing charge information 308 represents that “color” printing costs “¥20”, and “clear” printing costs “¥30”.

Note that the processing charge is set uniformly throughout the image forming system in the example of FIG. 6, but may also be set individually for each image forming apparatus.

(3) Print Information Management Unit and Use Status Acquisition Unit

When the user sets print information and issues a print request in the image forming apparatus 102, a print information management unit and use status acquisition unit start processes to execute print processing in the image forming apparatus 102 and manage it in the information processing apparatus 101.

The print information includes the print sheet count, page count, print size, the type of paper for use, information (user information) on a user who has issued a print request, and information (color information) on color printing.

In FIG. 3, a print information management unit 303 collects log information from the image forming apparatus 102 via a use status acquisition unit 304, and manages it as print log information 307. Based on the collected log information, the print information management unit 303 calculates the cumulative number of sheets used and the cumulative amount of money used, and manages the actual performance as cumulative sheet count & cumulative money amount information 309.

FIG. 7 is a table showing an example of the print log information 307. As shown in FIG. 7, the print log information 307 manages print log information in correspondence with a "job ID" serving as identification information for each job. The log information also includes "print sheet count" representing the number of printed sheets, "user name" which is user identification information and represents the name, and "print type" representing the type of printing such as color printing or monochrome printing.

The print log information 307 further includes "first path" setting representing whether the current job is a first-path job when performing 2-path processing, and "second path" setting representing whether the current job is a second-path print job when performing 2-path processing.

In the example of FIG. 7, the print log information 307 represents that for a job of job ID "1", the print sheet count is "3", the user who has issued a print request is "B", and the print type is "color printing". The absence of information on "first path" and "second path" means that the job of job ID "1" is not "2-path printing" but normal printing.

Similarly, the print log information 307 represents that for a print job of job ID "3", user "C" has executed color+clear printing by one apparatus (1-path printing). The print log information 307 represents that for a print job of job ID "5", the print sheet count is "2", the user who has issued a print request is "A", and the print type is "color printing". "○" in "first path" means that the job of job ID "5" is a first-path job in "2-path printing". The print log information 307 represents that a job of job ID "6" is requested by user "E" and the print type is "clear printing". Also, "○" in "second path" means that the job of job ID "6" is a second-path job in "2-path printing".

FIG. 8 is a table showing an example of the cumulative sheet count & cumulative money amount information 309. The cumulative sheet count & cumulative money amount information 309 represents the cumulative sheet count and cumulative money amount of user "A" upon completion of a job (first-path processing) in the image forming apparatus 102.

As shown in FIG. 7, the job of job ID "5", printing of which has been requested by user "A", is complete at this time. The cumulative sheet count and cumulative money amount for user "A" are calculated based on the print log information 307 and device information 306.

More specifically, since the print sheet count is "2" and the print type is "color", a cumulative sheet count of 2 and a cumulative money amount of ¥40 (2 sheets×¥20) are calculated.

(4) 2-Path Upper Limit Management Unit

In FIG. 3, a 2-path upper limit management unit 310 identifies, based on the print log information 307, the latest job which is complete in the image forming apparatus 102.

By referring to a user name corresponding to the identified job, the 2-path upper limit management unit 310 identifies a user who has requested printing of the print job. The 2-path upper limit management unit 310 compares the user information 305 and cumulative sheet count & cumulative money amount information 309 of the identified user, and determines whether the cumulative sheet count or cumulative money amount has reached the upper limit value of use set in the user information 305. The 2-path upper limit management unit 310 determines whether the user can execute second-path processing, and notifies the image <4. Processing Sequence in 2-Path Upper Limit Management Unit>

Figure 9A:
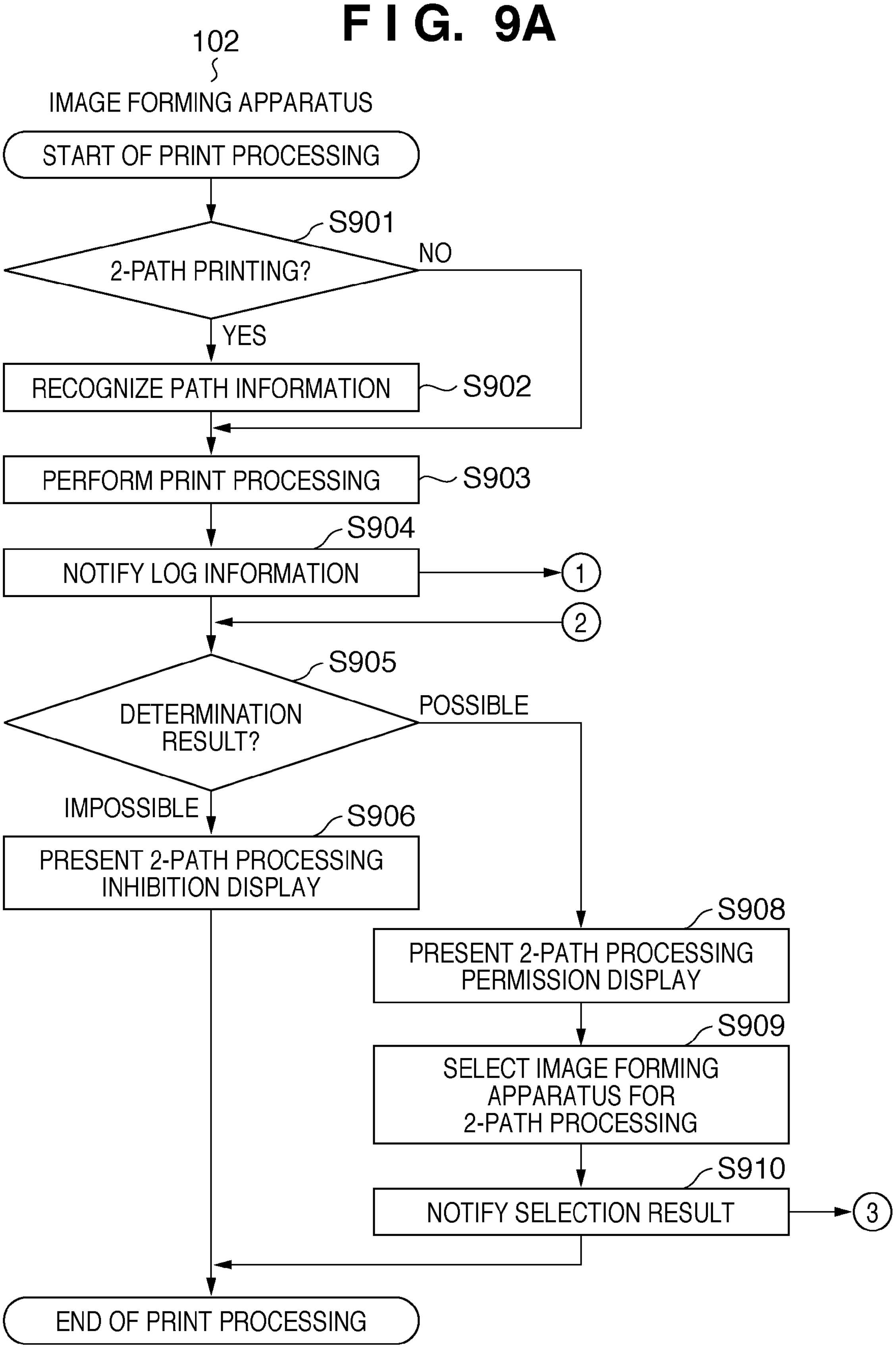
FIGS. 9A to 9C are flowcharts showing the sequence of processing in a 2-path upper limit management unit 310 of the information processing apparatus 101 and those of corresponding processes in the image forming apparatuses 102 and 103.
Figure 9B:
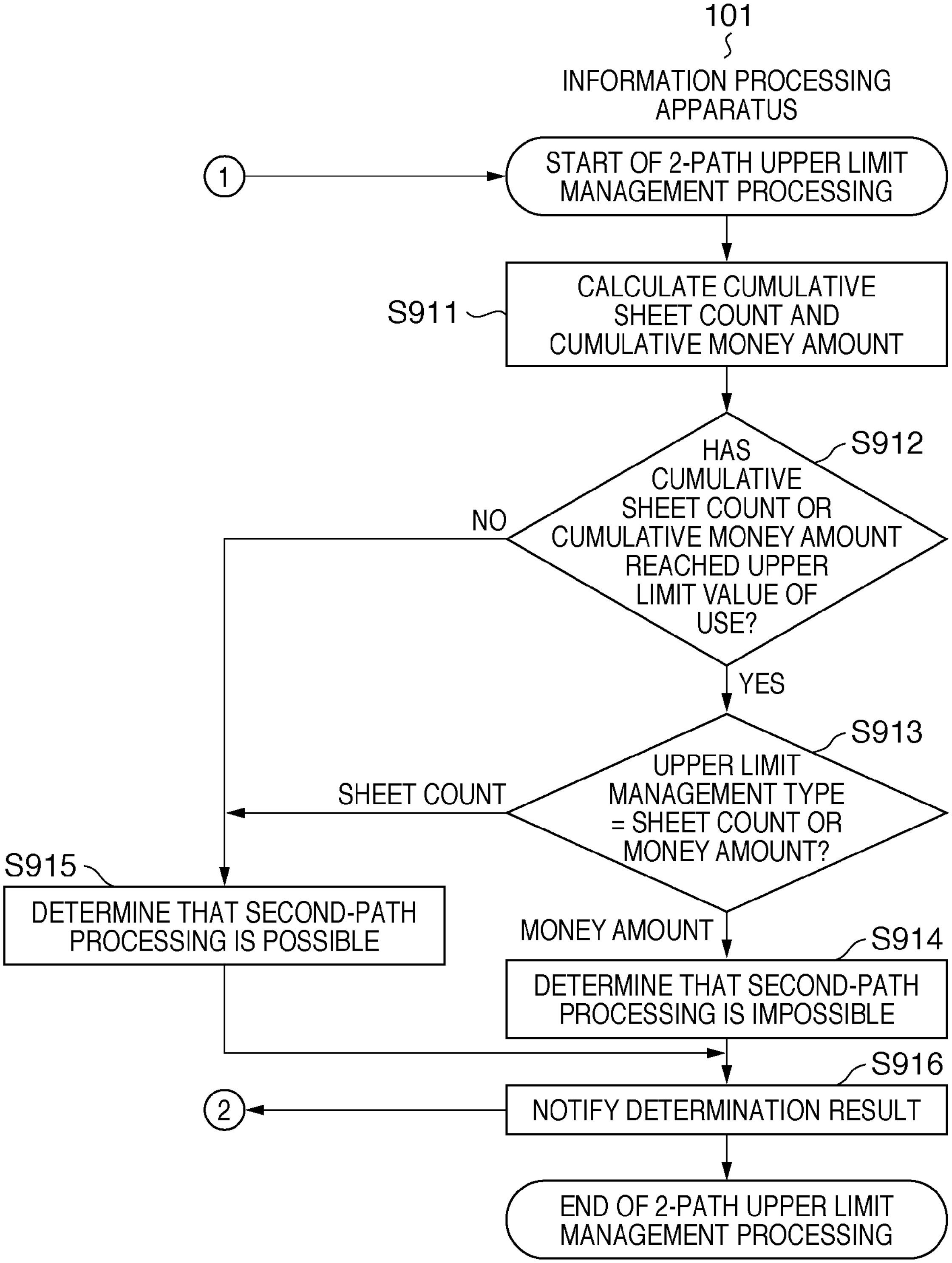
Figure 9C:
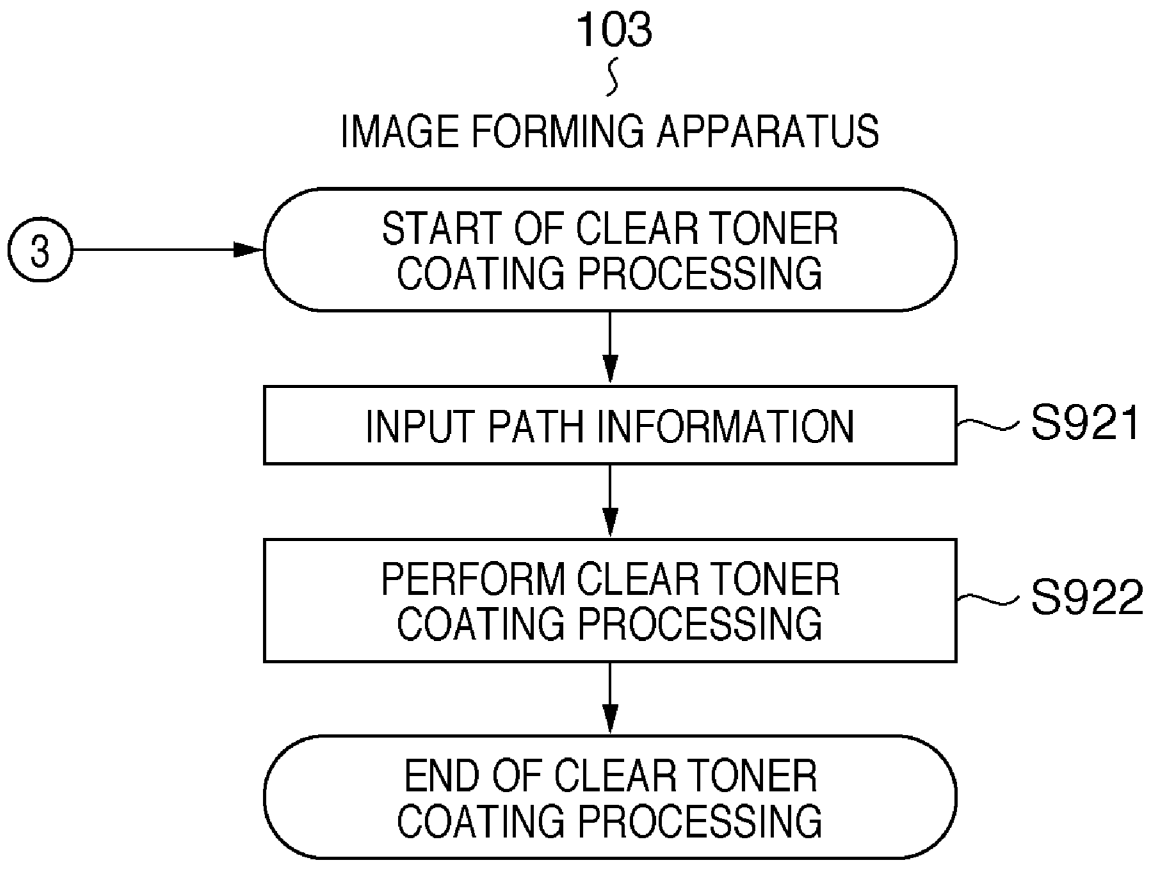

The sequence of 2-path upper limit management processing in the 2-path upper limit management unit 310 will be explained. FIGS. 9A to 9C are flowcharts showing the sequence of processing in the 2-path upper limit management unit 310 of the information processing apparatus 101 and those of corresponding processes in the image forming apparatuses 102 and 103. The 2-path upper limit management processing will be described while referring to windows (FIGS. 10 to 13) displayed on the operation unit 228 of the image forming apparatus 102 or 103.

When the user selects a job and sets print information via the operation unit 228 of the image forming apparatus 102, and then issues a print request, print processing starts.

In step S901, the operation unit 228 displays a UI window (FIG. 10) for setting whether the current job requires 2-path printing, and if the current job requires 2-path printing, setting whether the current job is a first- or second-path job.

Figure 10:
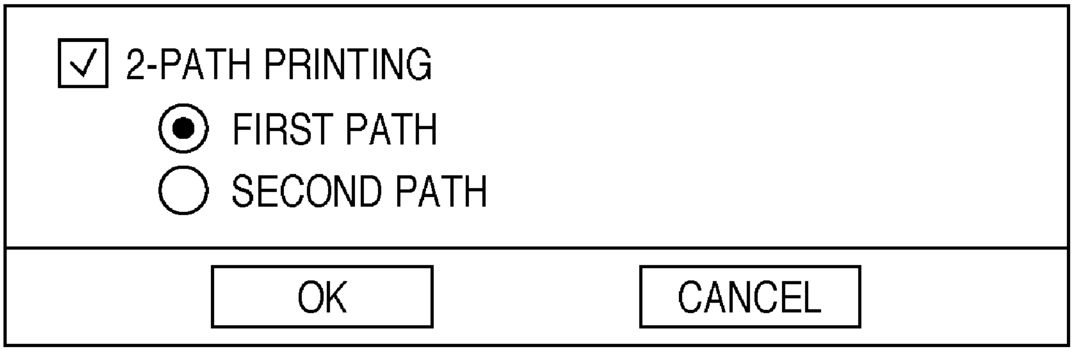
FIG. 10 is a view showing an example of a UI window displayed on an operation unit 228 of the image forming apparatus 102.

The user makes predetermined settings in the UI window shown in FIG. 10. In the example of FIG. 10, the current job requires 2-path processing and is a first-path job.

If the user selects 2-path processing in step S901, the process advances to step S902 to recognize path information (information on whether the current path is the first or second path) set in the UI window shown in FIG. 10. Then, the process advances to step S903.

If the user does not select 2-path processing in step S901, the process directly advances to step S903.

In step S903, the image forming apparatus 102 executes print processing for the selected job on the basis of the set print information. During print processing, the general counting function and charging function operate sequentially. While referring to the user information 305 of the user who has issued the print request, the image forming apparatus 102 determines whether the cumulative sheet count or cumulative money amount has reached the upper limit value of use.

Although not shown in FIGS. 9A to 9C, if the cumulative sheet count or cumulative money amount reaches the upper limit value of use during execution of print processing in the image forming apparatus 102, print processing stops and the user is notified of a message, as print inhibition processing. As another inhibition processing, the user is given a warning that the cumulative sheet count or cumulative money amount has reached the upper limit, and then continuation of printing is permitted.

If the image forming apparatus 102 completes print processing for the selected job in step S903, the process advances to step S904. In step S904, the image forming apparatus 102 transmits log information to the information processing apparatus 101.

After the image forming apparatus 102 transmits log information to the information processing apparatus 101 in step S904, the information processing apparatus 101 starts 2-path upper limit management processing.

In step S911, the information processing apparatus 101 stores the print log information 307 on the basis of the log information transmitted from the image forming apparatus 102. The information processing apparatus 101 calculates the cumulative sheet count & cumulative money amount information 309 on the basis of the stored print log information 307 and the device information 306.

In step S912, if the current job is a first-path job in 2-path processing, the information processing apparatus 101 compares the calculated cumulative sheet count & cumulative money amount information 309 with the upper limit value of use for the user in the user information 305.

If the information processing apparatus 101 determines as a result of the comparison in step S912 that the calculated cumulative sheet count & cumulative money amount information 309 has reached the upper limit value of use, the process advances to step S913. If the information processing apparatus 101 determines as a result of the comparison in step S912 that the calculated cumulative sheet count & cumulative money amount information 309 has not reached the upper limit value of use, the process advances to step S915.

In step S913, the information processing apparatus 101 determines whether the type of the upper limit value of use that has been used to determine that the calculated cumulative sheet count & cumulative money amount information 309 has reached the upper limit value of use is “upper limit sheet count” or “upper limit money amount”. If the information processing apparatus 101 determines in step S913 that the type of the upper limit value of use is “upper limit money amount”, the process advances to step S914 to determine that second-path processing is impossible. If the information processing apparatus 101 determines in step S913 that the type of the upper limit value of use is “upper limit sheet count”, the process advances to step S915 to determine that second-path processing is possible.

Assume that the cumulative sheet count & cumulative money amount information 309 represents the cumulative sheet count=2 and the cumulative money amount=¥40, as shown in FIG. 8. Also assume that the user information 305 for user “A” represents the upper limit sheet count=2, as shown in 4*a* of FIG. 4.

In this case, although the cumulative sheet count has reached the upper limit sheet count, the type of the upper limit value of use is “upper limit sheet count”, and thus it is determined that second-path processing is possible.

To the contrary, assume that the user information 305 for user “A” represents the upper limit money amount=¥40, as shown in 4*b* of FIG. 4. In this case, the cumulative money amount has reached the upper limit money amount, the type of the upper limit value of use is “upper limit money amount”, and thus it is determined that second-path processing is impossible.

Even if the cumulative money amount of user “A” has not reached the upper limit money amount in step S912, it can also be determined based on print information whether the cumulative money amount will exceed the upper limit money amount upon clear printing in the second path. If it is predicted that the cumulative money amount will exceed the upper limit money amount for the user upon clear printing in the second path, the process advances to step S914.

In step S916, the information processing apparatus 101 notifies the image forming apparatus 102 of the determination result in step S914 or S915, and then ends the 2-path upper limit management processing.

Upon receiving the determination result from the information processing apparatus 101, the image forming apparatus 102 analyzes the contents of the notified determination result in step S905. If the image forming apparatus 102 determines as a result of the analysis in step S905 that second-path processing is impossible, the process advances to step S906 to display a message on the operation unit 228 to inhibit 2-path printing.

Figure 11:
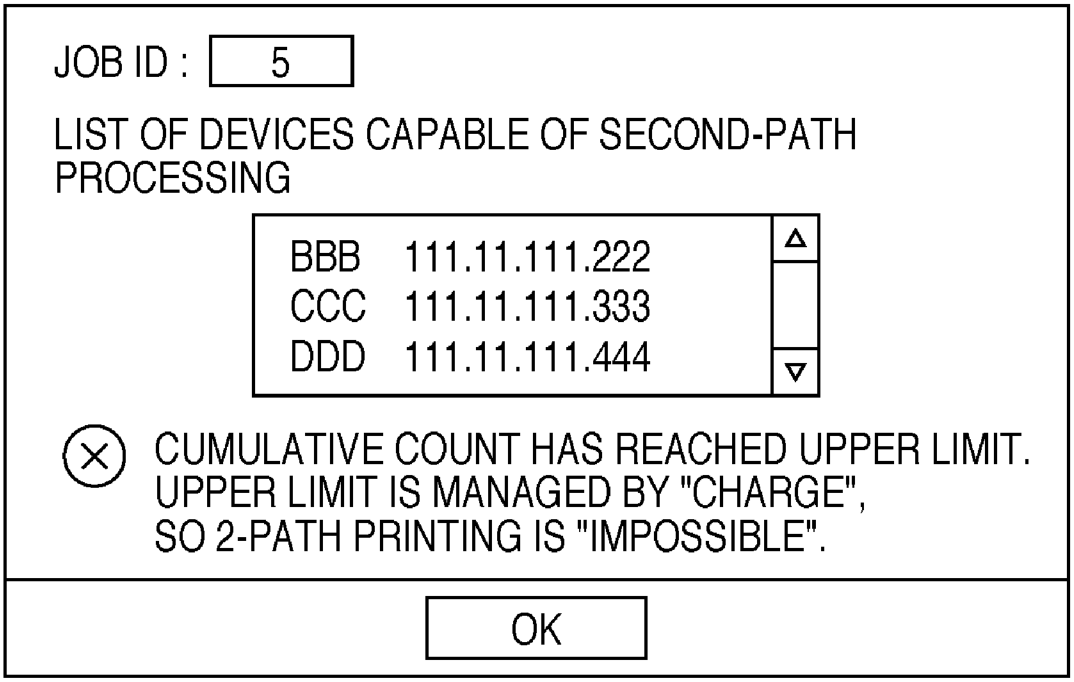
FIG. 11 is a view showing an example of a UI window displayed on the operation unit 228 of the image forming apparatus 102.

FIG. 11 is a view showing an example of the 2-path printing inhibition display appearing on the operation unit 228. Since the cumulative money amount has reached the upper limit money amount, the user is notified of, as the 2-path processing inhibition display, a message that the 2-path processing cannot proceed to second-path processing, as shown in FIG. 11.

If the image forming apparatus 102 determines as a result of the analysis in step S905 that second-path processing is possible, the process advances to step S908 to display a 2-path processing permission message on the operation unit 228.

Figure 12:
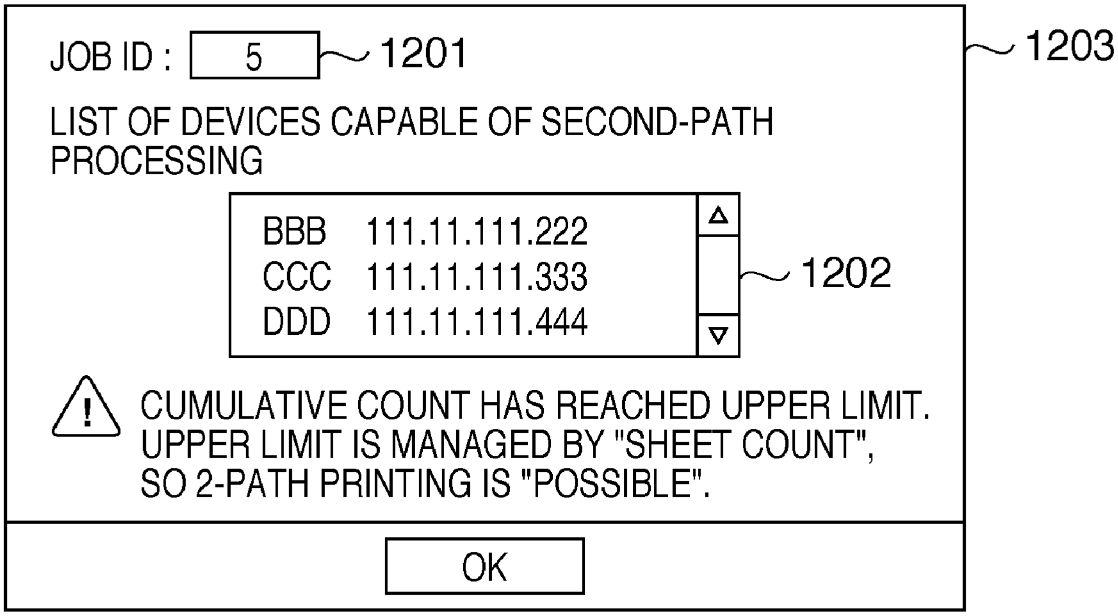
FIG. 12 is a view showing an example of a UI window displayed on the operation unit 228 of the image forming apparatus 102.

FIG. 12 is a view showing an example of the 2-path printing permission display appearing on the operation unit 228. As shown in FIG. 12, as the 2-path printing permission display, a field 1201 displays a job ID having undergone first-path print processing. A field 1202 displays a list of image forming apparatuses capable of second-path processing. The type of the upper limit value of use is “upper limit sheet count”. Thus, although the cumulative sheet count has reached the upper limit value of use upon completion of first-path processing, the user is notified of a message that the 2-path printing can proceed to second-path processing.

If the user selects, in the display presented in step S908, an image forming apparatus for executing second-path processing, the image forming apparatus 102 accepts the selection result in step S909. In step S910, the image forming apparatus 102 notifies, of the selection result, an image forming apparatus (in this case, the image forming apparatus 103) selected as one for executing second-path processing. Upon completion of notifying the selection result in step S910, the image forming apparatus 102 ends the print processing.

Upon receiving the selection result notification, the image forming apparatus 103 starts clear toner print processing. In the image forming apparatus 103, the user feeds a printed material delivered from the image forming apparatus 102, selects a job in advance via the operation unit 228, and sets processing information.

If the image forming apparatus 103 receives the selection result notification from the image forming apparatus 102 in this state, the process advances to step S921. In step S921, the operation unit 228 displays a UI window (FIG. 13) for setting whether the current job requires 2-path printing, and if the current job requires 2-path printing, setting whether the current print job is a first- or second-path job.

Figure 13:
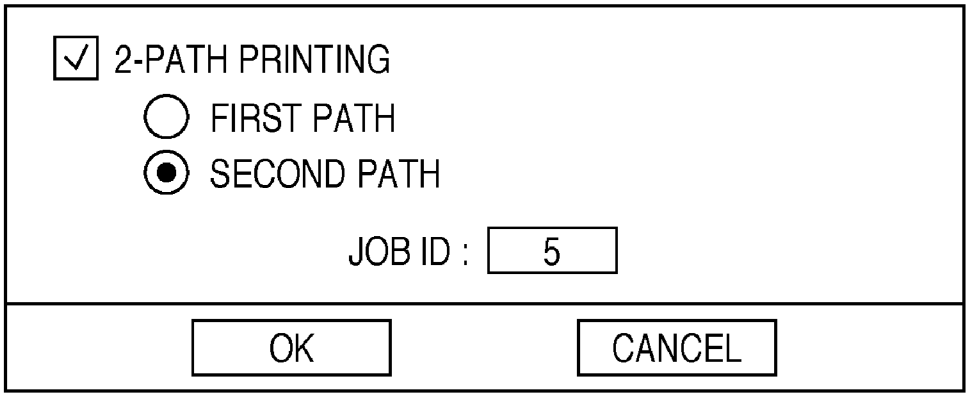
FIG. 13 is a view showing an example of a UI window displayed on an operation unit 228 of the image forming apparatus 103.

The user makes predetermined settings in the UI window shown in FIG. 13. In the example of FIG. 13, the current job requires 2-path processing and is a second-path job. At the same time, it is also possible to accept input of a job ID notified from the image forming apparatus 102, and only when a correct job ID is accepted from the user, permit execution of the job.

In step S922, the image forming apparatus 103 executes clear toner print processing for the selected job on the basis of set processing information. During the processing, the general charging function operates sequentially. While referring to the user information 305 of the user who has issued the processing request, the image forming apparatus 103 determines whether the cumulative sheet count or cumulative money amount has reached the upper limit value of use.

Although not shown in FIGS. 9A to 9C, if the cumulative sheet count or cumulative money amount reaches the upper limit value of use during execution of processing in the image forming apparatus 103, print processing stops and the user is notified of a message.

Upon completion of the clear toner print processing in step S922, the process ends.

<5. Management Information After Processing>

FIGS. 14 and 15 show information after updating the print log information and the cumulative sheet count & cumulative money amount information in the information processing apparatus 101 after 2-path printing by user A.

In FIG. 14, job ID “7” is added. This represents the print log of the second path, and (5) in the job ID column is the job ID of a corresponding first path.

In FIG. 15, no cumulative sheet count changes in cumulative sheet count & cumulative money amount information after second-path processing by user A. As for the cumulative money amount, the charge of two sheets by clear printing is added.

As is apparent from the above description, according to the embodiment, upon completion of first-path processing in the 2-path printing system, it is determined whether to advance to second-path processing. In particular, the processing switches depending on which of the sheet count and money amount is used to manage the upper limit for a user.

As a result, it can be appropriately determined whether 2-path printing can proceed to second-path processing.

Other Embodiments

The present invention may be applied to a system including a plurality of devices (e.g., a host computer, interface device, reader, and printer) or an apparatus (e.g., a copying machine or facsimile apparatus) formed by a single device.

The object of the present invention is also achieved by supplying a computer-readable storage medium which stores software program codes for implementing the functions of the above-described embodiment to a system or apparatus. In this case, these functions are implemented by reading out and executing the program codes stored in the storage medium by the computer (or the CPU or MPU) of the system or apparatus. In this case, the storage medium which stores the program codes constitutes the present invention.

The storage medium for supplying the program codes includes a Floppy® disk, hard disk, optical disk, magnetooptical disk, CD-ROM, CD-R, magnetic tape, nonvolatile memory card, and ROM.

The present invention is not limited to a case wherein the functions of the above-described embodiment are implemented when the computer executes the readout program codes. Also, the present invention includes a case wherein an OS (Operating System) or the like running on the computer performs some or all of actual processes on the basis of the instructions of the program codes and thereby implements the functions of the above-described embodiment.

Furthermore, the present invention includes a case wherein the functions of the above-described embodiment are implemented after the program codes read out from the storage medium are written in the memory of a function expansion board inserted into the computer or the memory of a function expansion unit connected to the computer. That is, the present invention also includes a case wherein after the program codes are written in the memory, the CPU of the function expansion board or function expansion unit performs some or all of actual processes on the basis of the instructions of the program codes and thereby implements the functions of the above-described embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-121649, filed May 7, 2008, which is hereby incorporated by reference herein in its entirety.

What is claimed is:

1. A printing system capable of implementing 2-path printing using a plurality of image forming apparatuses in cooperation with each other, the system comprising:

a processor coupled to a memory, cooperating to function as:

an actual performance management unit configured to manage, as an actual performance for each user, a count of sheets used in print processing;

an upper limit management unit configured to store an upper limit value of a printable sheet count for each user, and perform print inhibition processing based on a print request from a user for whom the actual performance of the sheet count managed by the actual performance management unit exceeds the upper limit value;

a first processing unit configured to, in a first image forming apparatus, execute a first-path print processing in a 2-path printing and deliver a printed material; and a second processing unit configured to execute a second-path print processing in the 2-path printing, for the printed material on which the first processing unit executed the first-path print processing, in a second image forming apparatus different from the first image forming apparatus, wherein, even if the actual performance of the sheet count managed by the actual performance management unit for a user who designated the 2-path printing has reached the upper limit value in the second-path print processing in the 2-path printing, the upper limit management unit does not perform the print inhibition processing, and the second processing unit performs the second-path print processing.

2. The system according to claim 1, wherein, in the 2-path printing, a printed material obtained by either color printing or monochrome printing in a first path undergoes, in a second path, print processing of applying a clear toner or compositing form data registered in advance.

3. The system according to claim 1, wherein the print inhibition processing includes notifying the user who designated the 2-path printing that processing cannot be continued.

4. The system according to claim 1, wherein the actual performance management unit manages, as actual performance for each user, a money amount charged for print processing, the upper limit management unit stores a usable upper limit money amount for each user, and performs the print inhibition processing based on a print request from a user for whom the actual performance of the money amount managed by the actual performance management unit exceeds the upper limit money amount, and the processor coupled to the memory cooperate to function as a setting unit configured to set whether the sheet count or the money amount is used to perform upper limit management for each user by the upper limit management unit.

5. The system according to claim 4, wherein when the setting unit sets to perform upper limit management for each user based on the sheet count, even if the actual performance of the sheet count managed by the actual performance management unit for the user who designated the 2-path printing has reached the upper limit value in the second-path print processing in the 2-path printing, the upper limit management unit does not perform the print inhibition processing, and the second processing unit performs the second-path print processing, and when the setting unit sets to perform upper limit management for each user based on the money amount, if the actual performance of the money amount managed by the actual performance management unit for the user who designated the 2-path printing has reached the upper limit money amount in the second-path print processing in the 2-path printing, the upper limit management unit performs the print inhibition processing.

6. An information processing method in a printing system for implementing 2-path printing using a plurality of image forming apparatuses in cooperation with each other, the method comprising steps of:

managing, as actual performance for each user, a count of sheets used in print processing;

storing an upper limit value of a printable sheet count for each user;

performing print inhibition processing based on a print request from a user for whom the actual performance of the sheet count managed in the managing step exceeds the upper limit value;

executing a first processing, in a first image forming apparatus, the first processing including a first-path print processing in 2-path printing, and outputting a printed material; and executing a second processing in a second image forming apparatus, the second processing including a second-path print processing in the 2-path printing for the printed material outputted in the first processing from the first-path print processing, the second image forming apparatus being different from the first image forming apparatus, wherein, even if the actual performance of the sheet count managed in the managing step for a user who designated the 2-path printing has reached the upper limit value in the second-path print processing in the 2-path printing, the print inhibition processing is not performed in the performing step, and the second-path print processing is performed in the second processing.

7. The method according to claim 6, wherein in the 2-path printing, a printed material obtained by either color printing or monochrome printing in a first path undergoes, in a second path, print processing of applying a clear toner or compositing form data registered in advance.

8. The method according to claim 6, wherein the print inhibition processing includes notifying the user who designated the 2-path printing that processing cannot be continued.

9. The method according to claim 6, wherein, in the managing step, a money amount charged for print processing is managed as an actual performance for each user, wherein, in the storing step, a usable upper limit money amount is stored for each user, and the print inhibition processing is performed based on a print request from a user for whom the actual performance of the money amount managed in the managing step exceeds the upper limit money amount, and wherein the method further comprises setting whether the sheet count or the money amount is used to perform upper limit management for each user in the storing step.

10. The method according to claim 9, wherein, when performing upper limit management for each user based on the sheet count is set in the setting step, even if the actual performance of the sheet count managed in the managing step for the user who designated the 2-path printing has reached the upper limit value in the second-path print processing in the 2-path printing, the print inhibition processing is not performed in the performing step, and the second-path print processing is performed in the second processing, and when performing upper limit management for each user based on the money amount is set in the setting step, if the actual performance of the money amount managed in the managing step for the user who designated the 2-path printing has reached the upper limit money amount in the second-path print processing in the 2-path printing, the print inhibition processing is performed in the performing step.

11. An information processing apparatus in a printing system for implementing 2-path printing using an image forming apparatus, the information processing apparatus comprising:

a processor coupled to a memory, cooperating to function as:

a collection unit configured to collect, from the image forming apparatus, log information of print processing that allows identification of a user who designated the print processing;

an actual performance management unit configured to manage, as an actual performance for each user, a count of sheets used in print processing based on the log information collected by the collection unit; and an upper limit management unit configured to store an upper limit value of a printable sheet count for each user, and perform print inhibition processing based on a print request from a user for whom the actual performance of the sheet count managed by the actual performance management unit exceeds the upper limit value, wherein, even if the actual performance of the sheet count managed by the actual performance management unit for a user who designated 2-path printing has reached the upper limit value in a second-path print processing in a 2-path printing, the upper limit management unit does not perform the print inhibition processing, and the second-path print processing in the 2-path printing is performed in the printing system.

12. The apparatus according to claim 11, wherein the print inhibition processing includes transmitting information to notify, via a display of an image forming apparatus that performed first-path print processing in the 2-path printing, a user who designated the 2-path printing, that processing cannot be continued.

13. The apparatus according to claim 11, wherein the actual performance management unit manages, as an actual performance for each user, a money amount charged for print processing, wherein the upper limit management unit stores a usable upper limit money amount for each user, and performs the print inhibition processing based on a print request from a user for whom the actual performance of the money amount managed by the actual performance management unit exceeds the upper limit money amount, and wherein the apparatus further comprises a setting unit configured to set whether the sheet count or the money amount is used to perform upper limit management for each user by the upper limit management unit.

14. The apparatus according to claim 11, wherein, when the setting unit sets to perform upper limit management for each user based on the sheet count, even if the actual performance of the sheet count managed by the actual performance management unit for the user who designated the 2-path printing has reached the upper limit value in the second-path print processing in the 2-path printing, the upper limit management unit does not perform the print inhibition processing, and, when the setting unit sets to perform upper limit management for each user based on the money amount, if the actual performance of the money amount managed by the actual performance management unit for the user who designated the 2-path printing has reached the upper limit money amount in the second-path print processing in the 2-path printing, the upper limit management unit performs the print inhibition processing.

15. An information processing method in an information processing apparatus of a printing system for implementing 2-path printing using an image forming apparatus, the method comprising steps of:

collecting, from the image forming apparatus, log information of print processing that allows identification of a user who designated the print processing;

managing, as an actual performance for each user, a count of sheets used in print processing based on the log information collected in the collecting step;

storing an upper limit value of a printable sheet count for each user; and performing print inhibition processing based on a print request from a user for whom the actual performance of the sheet count managed in the managing step exceeds the upper limit value, wherein, even if the actual performance of the sheet count managed in the managing step for a user who designated 2-path printing has reached the upper limit value in a second-path print processing in a 2-path printing, the print inhibition processing is not performed in the performing step, and the second-path print processing in the 2-path printing is performed in the printing system.

16. The method according to claim 15, wherein the print inhibition processing includes transmitting information to notify, via a display of an image forming apparatus that performed first-path print processing in the 2-path printing, a user who designated the 2-path printing that processing cannot be continued.

17. The method according to claim 15, wherein, in the managing step, a money amount charged for print processing is managed as actual performance for each user, wherein, in the storing step, a usable upper limit money amount is stored for each user, and the print inhibition processing is performed based on a print request from a user for whom the actual performance of the money amount managed in the managing step exceeds the upper limit money amount, and wherein the method further comprises setting whether the sheet count or the money amount is used to perform upper limit management for each user in the storing step.

18. The method according to claim 15, wherein, when performing upper limit management for each user based on the sheet count is set in the setting step, even if the actual performance of the sheet count managed in the managing step for the user who designated the 2-path printing has reached the upper limit value in the second-path print processing in the 2-path printing, the print inhibition processing is not performed in the performing step, and, when performing upper limit management for each user based on the money amount is set in the setting step, if the actual performance of the money amount managed in the managing step for the user who designated the 2-path printing has reached the upper limit money amount in the second-path print processing in the 2-path printing, the print inhibition processing is performed in the storing step.

19. A non-transitory computer-readable storage medium storing code for a computer program that causes a computer to perform the information processing method recited in claim 15.

20. An image forming apparatus for implementing 2-path printing in cooperation with a second image forming apparatus in a printing system, in which a count of sheets used in print processing is managed as an actual performance for each user, and in which print inhibition processing is performed based on a print request from a user for whom the actual performance of the sheet count managed for each user exceeds an upper limit value, the apparatus comprising:

a feed unit configured to feed a printed material of the second image forming apparatus;

a processing unit configured to perform a second-path print processing in a 2-path printing for the printed material fed by the feed unit;

an acquisition unit configured to acquire identification information used to manage an actual performance of a count of sheets used in print processing for each user in a first-path print processing in the 2-path printing; and an output unit configured to externally output log information of the print processing by the processing unit together with the identification information acquired by the acquisition unit, wherein, even if the actual performance of the count of sheets used in a print processing for a user who designated the 2-path printing has reached an upper limit value, print inhibition processing is not performed, and the processing unit performs the second-path print processing.

21. A processing method in an image forming apparatus for implementing 2-path printing in cooperation with a second image forming apparatus in a printing system, in which a count of sheets used in print processing is managed as an actual performance for each user, and in which print inhibition processing is performed based on a print request from a user for whom the actual performance of the sheet count managed for each user exceeds an upper limit value, the method comprising steps of:

feeding a printed material of the second image forming apparatus;

performing second-path print processing in a 2-path printing for the printed material fed in the feed step;

acquiring identification information used to manage an actual performance of a count of sheets used in print processing for each user in a first-path print processing in the 2-path printing; and externally outputting log information of the print processing in the performing step together with the identification information acquired in the acquiring step, wherein, even if the actual performance of a count of sheets used in a print processing for a user who designated the 2-path printing has reached an upper limit value, print inhibition processing is not performed, and the second-path print processing is performed in the performing step.

22. A non-transitory computer-readable storage medium storing code for a computer program that causes a computer to perform the processing method recited in claim 21.

* * * * *